United States Patent [19]

Williams

[11] 4,308,459
[45] Dec. 29, 1981

[54] ULTRAVIOLET RADIATION DETECTION DEVICE

[76] Inventor: Gwyn P. Williams, 4 Harbor Hills Dr., Port Jefferson, N.Y. 11777

[21] Appl. No.: 152,333
[22] Filed: May 22, 1980
[51] Int. Cl.³ .............................................. G01N 5/00
[52] U.S. Cl. .................................................... 250/474
[58] Field of Search ........................ 250/474; 252/408; 204/157.1 R

[56] References Cited

U.S. PATENT DOCUMENTS 3,194,963 7/1965 McKee .................................. 250/474
3,787,687 1/1974 Trumble .............................. 250/474
3,899,677 8/1975 Hori et al. ............................ 250/474

FOREIGN PATENT DOCUMENTS 920689 3/1963 United Kingdom.
1422631 1/1976 United Kingdom.
1507486 4/1978 United Kingdom.

*Primary Examiner*—Davis L. Willis
*Attorney, Agent, or Firm*—Kevin Redmond

[57] ABSTRACT

An ultraviolet dosimeter, which indicates dose accumulation by the multicolored change of a sensitized element. The indicated doses are readily observed in bright sunlight by direct comparison with standards.

10 Claims, 4 Drawing Figures

ULTRAVIOLET RADIATION DETECTION DEVICE

BACKGROUND

1. Field

This invention relates to a device for monitoring radiation accumulation and in particular to a device for monitoring integrated ultraviolet radiation dose accumulation.

2. Prior Art

Prior art devices include those which merely indicate the ultraviolet dose by changing shade of the same color. As a result, it is difficult to determine accurately the actual dose received. These devices are of limited dynamic range and to be useful for protection against sunburn, they require filters to extend their range, making them cumbersome and costly devices to use. Sometimes the devices involve liquids which have to be contained, making their use even more complicated.

Example of these devices are illustrated in British Pat. Nos. 1,507,486 and 1,422,631.

SUMMARY

The exposure of human tissue to ultraviolet radiation causes the release of free radicals in the dermis and epidermis which has two principal effects:

(a) Erythema, which is a burning or reddening of the affected area, and (b) Melanogenesis which is a tanning or browning.

Erythema is used medically to treat patients having skin disorders, for example, whereas melanogenesis is the tanning familiar to sun bathers.

In practice, difficulties arise in judging the period of time and the amount of ultraviolet radiation which human tissue is exposed. For example, achievement of suntan by sunbathing is at present largely a matter of individual guesswork based on experience but reception of excessive ultraviolet radiation can be extremely painful as well as causing peeling and unsightly reddening of the skin.

It is an object of this invention to provide a device which will provide an indication when a desired level of radiation has been reached.

In accordance with the present invention there is provided a device for indicating radiation dose accumulation which comprises a sensitized element for exposure to radiation and means for permitting comparison of radiation received by the sensitized element with a standard known to produce a degree of erythema or melanogenesis. In particular, the sensitized element may display several distinct colors and not merely shade of one color on exposure to the ultraviolet radiation and is therefore capable of indicating a wide range of radiation dose accumulation.

The present invention overcomes the difficulties described above with prior art devices. The invention comprises a paper coated with PVC latex and a plurality acid sensitive dyes. The latex coating becomes acidic in proportion to the amount of ultraviolet radiation which it receives. The released acid activates the color changes in the dyes which provide a visual indication the amount of radiation received.

DETAILED DESCRIPTION

Figure 1:
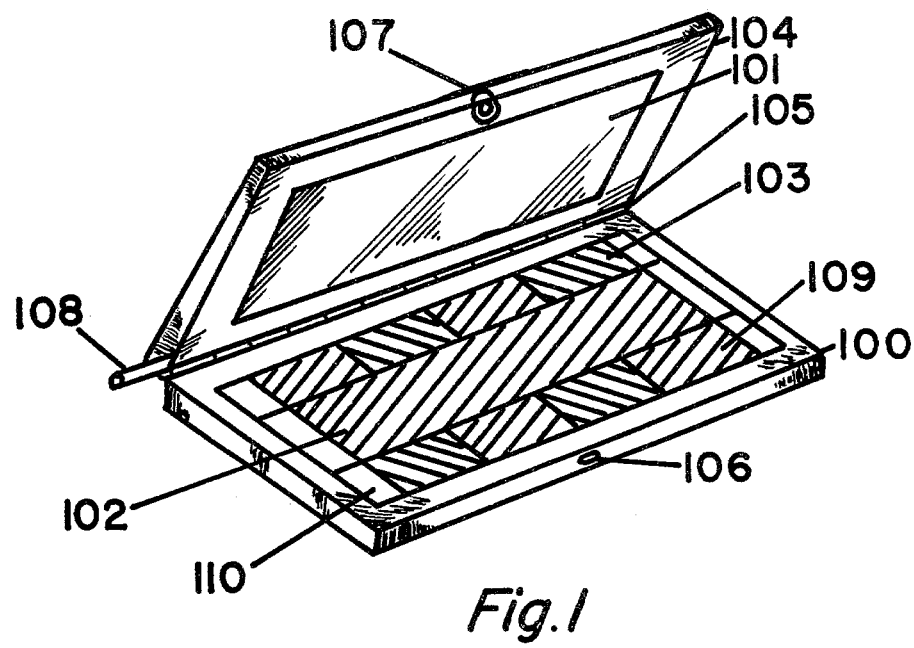
FIG. 1 illustrates a first embodiment of the invention in which the sensitized paper is contained within a protective case.

Referring to the construction shown in FIG. 1, this comprises a small case 100 having a lid 104 connected thereto by a hinge 105. Both case and lid are formed from a plastics material and carry respective elements 106 and 107 of a fastener, whereby the lid can be clipped to the case to hold it in its closed position.

Connected to the hinged side of the case is a safety pin 108 whereby the device can be attached to an article of clothing.

The case defines an internal shallow cavity in which are mounted three paper strips 102, 103, 109. These are laid parallel to one another within the cavity of the case and are held in place by detachable strips 110 at the ends.

The strips 103, 109 are divided into a number of zones of approximately equal size. In the example shown, four such zones are provided on each of the strips 103, 109. The zones are colored. Moreover the color change from one zone and the next as indicated by hatching in the drawing.

The strip 102 which lies between the strips 103, 109 is covered with a sensitized layer which is preferably acid sensitive dyes in contact with a halogen containing material. The sensitized layer is however of a kind which changes through a range of different colors very slowly under exposure to light rays. The lid 104 has a rectangular opening which may contain a transparent window 101. The window is constructed from a material providing filtration for light rays falling upon it. It allows through light rays in the ultraviolet band at least over the wavelengths known to produce erythema or melanogenesis dependent upon the use to which the device is to be put. Erythema occurs in the region 290 to 320 nanometers wavelengths and melanogenesis in the region 320 to 400 nanometers wavelengths.

In use when the device is to be used for melanogenesis it may be attached to an article of clothing so that solar radiation falling upon the users' skin will also fall upon the device and pass through the window 101 onto the sensitized surface of the strip 102.

Simultaneously, with exposure of the users skin to the sun rays, the sensitized layer 102 will change color. The user can check the extent of expected tanning by comparing the color of the strip 102 with the colors of the zones of the strips 103, 109 lying at opposite sides of it respectively. When the required degree of coloration of the strip 102 has been reached this will indicate that sufficient radiation has been received to provide the required tanning effect on the skin.

The strips 103, 109 may be of appropriate colors to provide precalculated tanning for fair skinned or dark skinned people. An example of the sensitized element is polyvinylchloride latex mixed with acid sensitive dyes, such as methylene blue and methal yellow, which are deposited on a paper substrate and allowed to dry to form a film on the paper.

When the above mentioned dyes are both used, the film is initially green. Upon exposure to ultraviolet radiation, chlorine is released and bonds with hydrogen to make the film progressively acidic on increasing exposure. In response to this the acid sensing dyes change color in following order: olive green, brown, purple and red.

On the first day a brown coloration would indicate a safe tanning exposure for an average person, while purple or red would indicate the possibility of a resulting burning. Note that the colors are indicative of the expected effect on the skin to aid the user in avoiding errors in using the device.

The spectoral response of the above described chemical combination used to form the film in the range 290 to 400 nm closely resembles that of human skin, thus the invention provide an accurate means of measuring the portion of the solar spectrum important for skin protection.

Where artificial sources of ultraviolet radiation are used, filters may be required because of the extended spectral range provided by such lamps.

A distinct advantage of the present invention over prior art devices is the wide dynamic range, which is from 0.1 to 10,000 millijoules per centimeter squared at 3,000 Å. Prior art devices have only been able to achieve this range with filters.

The present invention may be produced quickly and at low cost by printing. The sensing material is printed on a paper or other suitable substrate and then the comparison colors are printed about the sensitized areas to produce a device such as that shown in FIG. 3.

It is understood that all equivalent method of fabricating this device are included within the spirit and scope of the present invention. Such equivalent methods include separate printing of the sensitized areas and comparison colors which are combined in a later operation as for example by dicing the sensitized paper into small portions which are then applied with an adhesive to the substrate containing the comparison colors. For the sake of brevity, rolling, printing or other equivalent application techniques are referred to herein generally as printing.

Referring to FIG. 1, the strip 102 must be renewed before each period in the sun.

Figure 2A:
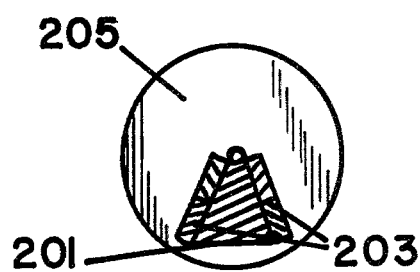
FIG. 2a illustrates a second embodiment of the invention in which the sensitive paper is contained behind a rotating disc which includes a window.
Figure 2B:
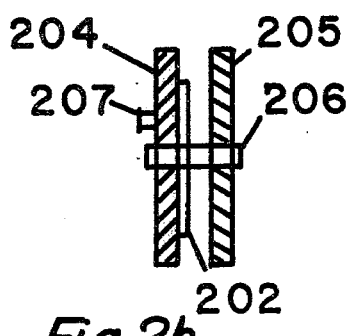
FIG. 2B is a sectional view of the device shown in FIG. 2A.

FIG. 2 shows a top view in FIG. 2A and a side view in FIG. 2B of the invention embodied as two parallel discs 204, 205 being capable of rotating with respect to each other about a central pivot 206. The sensitized paper 202 is mounted on the inner surface of disc 204 such that it may be exposed through the window 201 in disc 205. Adjacent to the window are comparison colors 203, used to judge the amount of ultraviolet exposure. For each period of exposure to ultraviolet radiation, disc 206 may be rotated to uncover a previously unexposed piece of sensitized paper 202 on disc 204. In this way, the device may be used for several such exposures before all the sensitized paper 202 has been exposed. The device may be removably attached to clothing by a clip or adhesive fastening 207.

Figure 3:
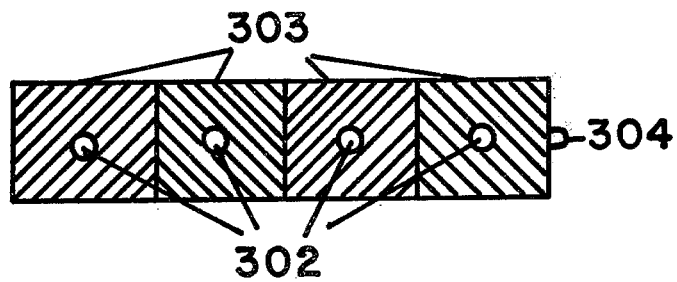
FIG. 3 illustrates a third embodiment of the invention in which sensitized dot are placed upon comparison color standards.

FIG. 3 shows the device embodied as a single strip divided into zones of different colors, 303. Within each zone lies a region of the sensitized paper 302. In this way, it is easy in sunlight to judge when a sensitized element 302 matches a particular color zone 303. A new strip is required for each exposure to ultraviolet radiation and the whole device therefore embodies several such strips in an envelope, one being removed at a time. The strips may be removably attached to clothing using a clip or pressure sensitive adhesive 304.

Having described my invention, I claim:

1. An ultraviolet dosimeter comprising:
   (a) an element coated with an ultraviolet sensitive film which changes through a plurality of colors, the color being produced is dependant on the duration of the exposure to ultraviolet radiation in the wavelength range (290–400 nm) which is known to cause enythema and melanogenesis, and
   (b) a set of comparison colors adjacent to the sensitized element to place the sensitized element in a position where it may be readily compared with the comparison colors to measure the dose of ultraviolet radiation accurately.

2. A device as claimed in claim 1, further comprising a plurality of sensitized element, a protective cover and means for advancing unexposed element to position of exposure for successive use of the device.

3. A device as claimed in claim 1, in which the spectral response of the sensitized element closely matches that of human skin.

4. A device as claimed in claim 1, in which the sensitized element comprises a plurality of acid sensitive dyes in contact with a halogen containing material in aqueous emulsion said halogen is released and combined with hydrogen from the water contained in the emulsion to make the film acidic upon receiving ultraviolet radiation said dyes changing through multiple colors in response to the degree of acidity.

5. A device as claimed in claim 1, in which the sensitized element is capable (without a filter) of responding to a dynamic range of from 0.1 to 10,000 millijoules per square centimeter at a 3000 Å.

6. A device as claimed in claim 1, in which the sensitized element is exposed through an aperture which forms part of the device.

7. A device as claimed in claim 1, in which the sensitized element is exposed through a filter to compensate for differences between artificial and natural forms of ultraviolet radiation.

8. A device as claimed in claim 4, in which methylene blue and dimethyl yellow dyes are mixed to produce an initially green film which progresses through brown, purple and red upon continued exposure to ultraviolet radiation.

9. A device as claimed in claim 1, in which the sensitized element is surrounded by the standard comparison color to provide for accurate dose measurement in strong sunlight.

10. A process for fabricating an ultraviolet dosimeter comprising the steps of:
   (a) providing a paper substrate,
   (b) printing sensitized portions on said paper by application of a latex emulsion containing multiple acid sensitive dyes to produce variable colors upon continuing exposure to ultraviolet radiation, and
   (c) printing on said substrate about said sensitized portions comparison colors corresponding to the colors produced during continued exposure of the sensitized portions to indicate the dose of radiation received.

* * * * *